US006104441A

United States Patent [19]
Wee et al.

[11] Patent Number: 6,104,441
[45] Date of Patent: Aug. 15, 2000

[54] SYSTEM FOR EDITING COMPRESSED IMAGE SEQUENCES

[75] Inventors: Susie J. Wee; Bhaskaran Vasudev, both of Mountain View, Calif.

[73] Assignee: Hewlett Packard Company, Palo Alto, Calif.

[21] Appl. No.: 09/069,596

[22] Filed: Apr. 29, 1998

[51] Int. Cl.[7] .............................. H04N 7/12; H04N 11/02; H04N 5/917; G11B 27/00

[52] U.S. Cl. ........................ 348/722; 348/400; 348/402; 348/409; 348/410; 348/411; 348/415; 345/328; 386/4; 386/33; 386/52; 386/111; 386/112

[58] Field of Search ................... 348/400–403, 348/409–412, 415, 700; 345/328; 382/235; 386/4, 33, 52, 111, 112

[56] References Cited

U.S. PATENT DOCUMENTS

| | | | |
|---|---|---|---|
| 5,050,225 | 9/1991 | Itoh | 382/46 |
| 5,157,488 | 10/1992 | Pennebaker | 358/133 |
| 5,168,375 | 12/1992 | Reisch et al. | 358/432 |
| 5,377,023 | 12/1994 | Sano et al. | 358/500 |
| 5,379,122 | 1/1995 | Eschbach | 358/426 |
| 5,408,274 | 4/1995 | Chang et al. | 348/700 |
| 5,408,328 | 4/1995 | Boliek et al. | 358/261.4 |
| 5,414,469 | 5/1995 | Gonzales et al. | 348/408 |
| 5,467,131 | 11/1995 | Bhaskaran et al. | 348/384 |
| 5,491,761 | 2/1996 | Kim | 382/251 |
| 5,631,742 | 5/1997 | Shimoda | 386/52 |
| 5,666,461 | 9/1997 | Igarashi et al. | 386/95 |
| 5,701,386 | 12/1997 | Yoneyama | 386/909 |
| 5,708,732 | 1/1998 | Merhav et al. | 382/232 |
| 5,710,873 | 1/1998 | Romano et al. | 395/115 |
| 5,732,183 | 3/1998 | Sugiyama | 386/4 |
| 5,739,862 | 4/1998 | Cen | 348/402 |
| 5,793,894 | 8/1998 | Sugiyama | 382/236 |
| 5,802,240 | 9/1998 | Asai | 386/52 |
| 5,812,791 | 9/1998 | Wasserman et al. | 395/200.77 |
| 5,864,682 | 1/1999 | Porter et al. | 395/200.77 |
| 5,912,709 | 6/1999 | Takahashi | 348/416 |
| 5,917,988 | 6/1999 | Eto | 386/52 |

OTHER PUBLICATIONS

Renato Kresch, Neri Merhav—"Fast DCT Domain Filtering Using the DCT and the DST", HP Laboratories Technical Report, HPL–95–140, Dec. 1995.

Neri Merhav—"Multiplication–Free Approximate Algorithms for Compressed Domain Linear Operations on Images", HP Laboratories Technical Report, HPL–96–111, Jul. 1996.

Joan L. Mitchell, William B. Pennebaker, Chad E. Fogg, and Didier J. LeGall—"MPEG Video Compression Standard", Digital Multimedia Standards Series, Chapman and Hall, 1997.

Neri Merhav, Vasudev Bhaskaran—"A Transform Domain Approach to Spatial Domain Image", HP Laboratories Technical Report, HPL–94–116, Dec. 1994.

Neri Merhav, Vasudev Bhaskaran—"Fast Inverse Motion Compensation Algorithms for MPEG–2 and for Partial DCT Information", HP Laboratories Technical Report, HPL–96–53, Apr. 1996.

(List continued on next page.)

Primary Examiner—John K. Peng
Assistant Examiner—Paulos Natnael
Attorney, Agent, or Firm—Marc P. Schuyler

[57] ABSTRACT

This disclosure provides for an image editing system that permits manipulation of compressed image formats without full decompression to the image domain. In particular, an editor manipulates discrete cosine transform ("DCT") coefficients for a dependent frame in a compressed image sequence to incorporate DCT representations of anchor frames upon which the dependent frame depends. Once converted, the frame can simply be reordered in the compressed domain without violating temporal dependencies, subject to bit rate matching. In one embodiment, an image sequence can be cut to leave remaining image frames which are then altered, so as to eliminate temporal dependencies upon eliminated frames. In another embodiment, an image sequence can be processed in the compressed domain for reverse-play. The editor provided by this disclosure permits real-time compressed domain editing applications, with reduced requirements for computational bandwidth.

22 Claims, 6 Drawing Sheets

OTHER PUBLICATIONS

Balas K. Natarajan, Bhaskaran Vasudev—"A Fast Approximate Algorithm for Scaling Down Digital Images in the DCT Domain", In Proceedings of the IEEE International Conference on Image Processing, Washington, D.C., Oct. 1995.

Bo Shen, Ishwar K. Sethi, Vasudev Bhaskaran—"Digital Video Blue Screen Editing in Compressed Domain", In Proceedings of the SPIE Visual Communications and Image Processing Conference, San Jose, CA, Feb. 1996.

B. Vasudev and K. Konstantinides—"Image and Video Compression Standards: Algorithms and Architectures", Kluwer Academic Publishers, 1995, Chapter 6—The MPEG Video Standards, pp. 179–212.

Susie J. Wee, Bhaskaran Vasudev—"Splicing MPEG Video Streams in the Compressed Domain", In the Proceedings of the IEEE International Conference on Multimedia Signal Processing, Princeton, NJ, Jun. 1997.

Shih–Fu Chang, David G. Messerschmitt—"Manipulation and Compositing of MC–DCT Compressed Video", IEEE Journal on Selected Areas in communications 13 (1995) Jan., No. 1, New York.

King Ngi Ngan, Roger John Clarke—"Lowpass Filtering in the cosine Transform Domain", 1980 IEEE.

Jae Beom Lee and Byeong Gi Lee—"Transform Domain Filtering Based on Pipelining Structure", IEEE Transactions on Signal Processing 40 (1992) Aug., No. 8, New York.

By Yoon Yung Lee and John W. Woods—"Video Post–Production with Compressed Images", SMPTE Journal, 103 (1994) Feb., No. 2, White Plains, New York.

Shih–Fu Chang—"New Algorithms for Processing Images in the Transform–Compressed Domain", SPIE vol. 2501/445.

Brian C. Smith and Lawrence A. Rowe , University of California at Berkeley—"Algorithms for Manipulating Compressed Images".

Jianhao Meng and Shih–Fu Chang—"Buffer Control Techniques for Compressed–Domain Video Editing", 1996 IEEE.

Neri Merhav, Vasudev Bhaskaran, Hewlett–Packard Laboratories—"Fast Inverse Motion Compensation Algorithms for MPEG–2 and for Partial DCT Information".

MPEG–2, DRAFT, International Standard, Video Recommendation ITU–T H.262, ISO/IEC 13818–2, Jan. 1995, Chapter 6.

Shih–Fu Chang and David G. Messerschmitt—"A New Approach to Decoding and Compositing Motion–Compensated DCT–Based Images", 1993 IEEE.

Shih–Fu Chang, Wen–Lung Chen, and David G. Messerschmitt, University of California at Berkeley—"Video Compositing in the DCT Domain".

Brian C. Smith, Cornell University—"Fast Software Processing of Motion JPEG Video", National Science Foundation, DCR–85–07256 and MIP–90–14940.

Frederick Kitson, Vasudev Bhaskaran, Deven Kalra—"Interactive Video from Desktops to Settops", HP Laboratories Technical Report, HPL–95–58, Jun. 1995.

SYSTEM FOR EDITING COMPRESSED IMAGE SEQUENCES

The present invention relates to compression of image sequences and, in particular, provides an editor which can re-order, splice or otherwise manipulate one or more image sequences without having to completely decompress every frame of those image sequences.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all rights whatsoever.

BACKGROUND

As with many of today's technologies, the current trend in image sequence developing and editing is to use digital formats. Even with motion picture film, editing of image sequences (including image splicing, color processing, and special effects) can be much more precisely accomplished by first converting images to a digital format, and performing desired edits upon the digital format. If desired, images can then be converted back to the original format.

Unfortunately, digital formats usually require enormous amounts of memory and transmission bandwidth. A single image with a resolution of 200×300 pixels can occupy megabytes of memory. When it is considered that many applications (for example, motion picture film processing) require far greater resolution, and that image sequences can include hundreds or thousands of images, it becomes very apparent that many applications are called upon to handle gigabytes of information, creating a bandwidth problem, in terms of computational and transmission resources.

To solve the bandwidth problem, standards have been proposed for image compression. These standards generally rely upon spatial or temporal redundancies which exist in one or more images.

A single image, for example, may have spatial redundancies in the form of regions having the same color (intensity and hue); a single, all blue image could potentially be represented simply by its intensity and hue, and information indicating that the entire frame has the same characteristics.

Temporal redundancies typically exist in sequences of images, and compression usually exploits these redundancies as well. For example, adjacent images in a sequence can be very much alike; exploiting redundancies, a compressed image sequence may include data on how to reconstruct current image frames based upon previously decoded frames. This data can be expressed as a series of vectors and difference information. To obtain this information, pixels in the second frame are grouped into images squares of 8×8 or 16×16 pixels ("blocks" of pixels), and a search is made in a similar location in a prior frame for the closest match. The vectors and difference information direct a decoder to reconstruct each image block of the second frame by going back to the first frame, taking a close match of data (identified by the vector) and making some adjustments (identified by the difference information), to completely reconstruct the second frame.

One group of standards currently popular for compression of image sequences has been defined by the Moving Picture Experts' Group, and these standards are generally referred to as "MPEG." The MPEG standards generally call for compression of individual images into three different types of compressed image frames: compressed independent ("I") frames exploit only spatial redundancies, and contain all the information necessary to reconstruct a single frame; compressed prediction ("P") frames exploit temporal redundancies from a prior frame (either a prior P or I frame) and typically only require only about ⅓ as much data as an I frame for complete frame reconstruction; and, compressed bidirectional ("B") frames can use data from either or both of prior and future frames (P or I frames) to provide frame reconstruction, and may only require ¼ as much data as a P frame. Other compression standards also rely upon exploitation of temporal image redundancies, for example, H.261 and H.263.

While very useful in reducing the amount of data necessary to completely reconstruct an image sequence, image compression techniques are typically not compatible with editors which manipulate image sequences. For example, it may be desired to play a compressed image sequence in reverse; because a compressed image sequence typically includes prediction frames, which are predicted based on previously decoded frames, playing such a sequence backward is extremely difficult unless the entire sequence is first decoded, and then reordered to a last-to-first format. If it is desired to cut and splice an image sequence, then it may not be possible to place a cut beginning with one image frame without prior decoding of many prior frames, because if the frame in question is encoded as (in MPEG compression) a P or B frame, information from one or more prior, cut frames may be needed in order to splice or reorder desired image frames. Typically, images in a MPEG sequence are formed into a group of picture ("GOP") which do not depend upon other frames, with all images in the GOP being completely decoded prior to any mixing of frames. For these reasons, editors typically operate in the image domain only, upon fully decompressed image sequences.

Figure 1:
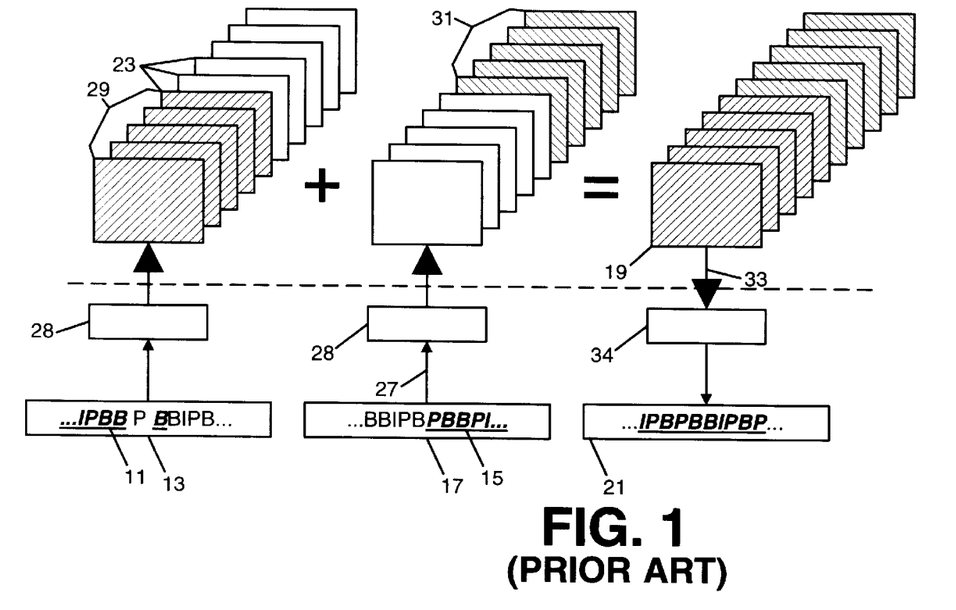

Conventional editing of compressed digital image sequences is illustrated in FIG. 1, in which a "head portion" 11 of a first compressed image sequence 13 is to be combined with a "tail portion" 15 of a second compressed image sequence 17, to form a composite image sequence 19. The composite image sequence may also be compressed, as indicated by reference numeral 21 in FIG. 1. Compressed frames representing the head portion 11, that is, a group of compressed frames from the first image sequence that will be retained, is seen in bold underlined text in coded order, as is a group of compressed frames representing the tail portion 15 of the second image sequence. Each sequence 13 and 17 is compressed using a MPEG standard, such as each of ten frames of the first image sequence, and ten frames of the second image sequence, are normally each maintained as an I, P or B frame; the image sequences can be stored in memory or CD-ROM, or transmitted via cable, the internet or modem, or made available in some other fashion.

To combine the head and tail portions 11 and 15, it is first conventionally necessary to decode compressed images, i.e., reconstitute each entire visual frame 23, as indicated by conversion arrows 25 and 27 and by decoders 28. As graphically indicated in FIG. 1, a first shaded group 29 of five frames (the end of the head portion) is to be retained from the first image sequence and a second hatched group 31 of five frames (the beginning of the tail portion) is to be retained from the second image sequence. Once completely decoded, the individual frames from the two image sequences can simply be reordered or combined in any fashion. If it is desired to have a compressed composite image, the composite image sequence 19 must typically then be re-encoded using a MPEG standard, as indicated by the reference numeral 33 of FIG. 1 and encoder 34. As is illustrated by comparing the three encoded sequences 13, 17 and 21, the encoded frames (I,P,B) for the composite image may be quite different from each the encoded frames for the first and second sequences.

Unfortunately, manipulation of individual images of a sequence heavily taxes computational resources when images must first be decompressed. For example, a typical editing application as just described can require over 20,000 MOPS ("million operations per second"), which necessitates enormous memory and computational resources. Further, data transmission rates are typically twenty million bits per second (20 mbps) for compressed image sequences, and one billion bits per second (1 bbps) for uncompressed image sequences. As can be seen, therefore, image editing as described cannot practically be implemented for use in either real-time applications, or upon a typical personal computer as, for example, in many video or internet applications.

A definite need exists for a system which permits manipulation of individual images, including reverse-play and image splicing, and which does not require compressed image sequences to be completely decoded. Ideally, such a system would have the capability to splice image sequences or otherwise manipulate images, entirely within the compressed domain (or at least without decoding entire GOPs). A need further exists for an inexpensive system, which can be implemented in software for use upon readily available image processing equipment and, more generally, upon readily available computing devices. Finally, a need exists for a real-time editor for compressed image sequences. The present invention satisfies these needs and provides further, related advantages.

SUMMARY

The present invention provides an editor that can manipulate a compressed image sequence without having to first completely decompress all of the images of the sequence. As such, the present invention provides a fast mechanism that can be easily implemented in most computing devices and image processing equipment. As one example, live camera feeds such as from one football game transmitted by satellite can be spliced with other compressed images, representing a commercial. An editor according to the present invention requires significantly less operations to perform editing upon compressed images, and therefore should present ready application to home computer use and real-time editing applications.

One form of the invention provides an apparatus for editing a sequence of images by manipulating the temporal order of the image sequence; "manipulating" and "editing" a "temporal order" are used herein to refer to manipulating the play order of at least one image frame relative to other frames including (but not limited to) splicing, where two image sequences are combined to recreate a third image sequence, reverse-play, where an image sequence is played in reverse order, and similar functions. In accordance with this form of the invention, the editor is used to select a temporal location within the sequence where images are to be cut or reordered. The editor removes a temporal dependency, such as a prediction upon prior or future frames, as appropriate. Removal of a temporal dependency is accomplished without converting the entire sequence to a set of ready-to-display ("image domain") images. For example, in accordance with the invention, the editor can cut and splice two sequences together by decoding to the image domain only a small number of tail frames and only a small number of head frames, and then reconverting them to an appropriate compressed image format ("compressed domain"). In the preferred embodiment, removal of temporal dependencies is performed entirely in the compressed domain, by operating on motion vector and discrete cosine transform ("DCT") information. In another embodiment, removal of temporal dependencies is achieved by decoding only select frames into the spatial domain.

A second form of the invention provides a method which corresponds to the processes performed by the editor described above, while a third form of the invention provides instructions stored on machine-readable media.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 1 is an illustrative diagram of one prior art editing scheme where two image sequences are to be cut and spliced together. As seen in FIG. 1, compressed images must typically first be completely converted to the image domain for editing, and then be converted back to the compressed domain.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of an editor for manipulating image order and providing a compressed output. The invention, however, may also be applied to other types of systems as well.

I. Introduction to the Principal Parts.

The preferred embodiment is a system that permits editing of image sequences in the compressed domain, that is, without requiring full decoding of compressed images. The present invention should therefore allow for image sequence processing using a relatively small amount of processing or transmission resources; for example, an editor embodying principles of the present invention may provide for real-time image processing where two images are spliced together using a personal computer running appropriate software, such as in video teleconferencing applications. Alternatively, the present invention may find application in a network editing system, where a commercial is to be mixed with a feed from a live sporting event.

Figure 2:
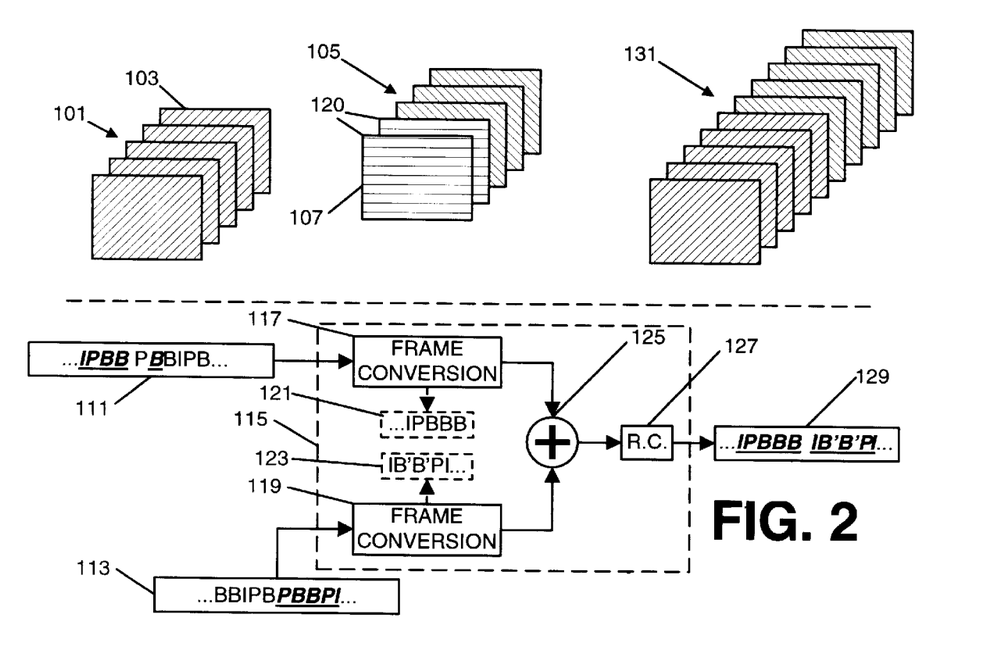
FIG. 2 is an illustrative diagram similar to FIG. 1, but which shows processing performed in accordance with the present invention. In particular, splicing of two image sequences together is performed by converting a limited number of frames to alter their temporal dependencies in a manner consistent with splicing.

FIG. 2 illustrates operation of the preferred embodiment in a splicing application, similar to the splicing application discussed above in connection with FIG. 1. As seen in FIG. 2, part of a first set 101 of images, ending with a head image 103, is to be spliced to part of a second set 105 of images, beginning with a tail image 107. Each of the first and second sets of images is stored in a compressed format, as indicated by a first set 111 of MPEG frames and a second set 113 of MPEG frames, with frames to be retained indicated in FIG. 2 by bold, underlined, italicized text. Each set of frames is fed in compressed format to an editor 115 which embodies principles of the present invention. Incoming compressed frames are subjected to frame conversion, as indicated by two reference blocks 117 and 119. The purpose of the frame conversion blocks is to modify dependencies of one or more particular frames upon other frames, so that the particular frames can be reordered or otherwise combined with different images or image sequences. The conversion can be performed simply by converting a limited number of frames (but not an entire GOP) to the image domain, as represented by two shaded frames 120, and then reconverting those shaded frames to the compressed domain. However, as described further below, conversion is preferably performed, not by converting to the image domain at all, but instead, by operations performed entirely within the compressed domain. For example, the two reference blocks 117 and 119 in the preferred embodiment indicate that each set of frames is converted (without performing an inverse discrete cosine transform "IDCT") to a compressed data subset 121 and 123, representing only those frames that are to be retained. These subsets are then combined, as indicated by a summing junction 125, and rate control is then applied to prevent data underflow or overflow, as indicated by reference block 127. The editor's finished product is then provided in a fully MPEG compliant compressed image output sequence 129, whereby editing has been accomplished to produce a composite image sequence 131, without fully decoding each of the two image sequences 103 and 105 to the image domain.

Referring to FIG. 1, discussed in the Background section above, a real-time splicing operation requiring full image sequence decoding and re-encoding can require as much as 20,000 MOPS ("millions of operations per second"); by instead performing splicing in the compressed domain as seen in FIG. 2, it is expected that the present invention can perform splicing at the rate of one splice per second using less than 2,000 MOPS. Preferably, the present invention is implemented as software run on a computer or special purpose editor (hereafter, both referred to as "computing devices").

As mentioned, "editing" or "manipulating" a "temporal order" refers to manipulation of images with respect to order in which they appear within their sequence and includes, for example, splicing images from one sequence with images from a different sequence, reordering compressed images to reverse a sequence to a reverse-play mode, dropping select images from a sequence, and playing a sequence in a fast-forward mode, etcetera. Also, the preferred application for the present invention is to MPEG format images; however, it should be understood that the present invention can be applied to other compressed image sequence formats as well, such as motion-JPEG, H.261, and H.263, as well as to prediction based compression schemes which do not employ a discrete cosine transform ("DCT") or a discrete sine transform ("DST"); for example, the present invention can be applied to schemes which use wavelet or sub-band transforms.

Figure 3:
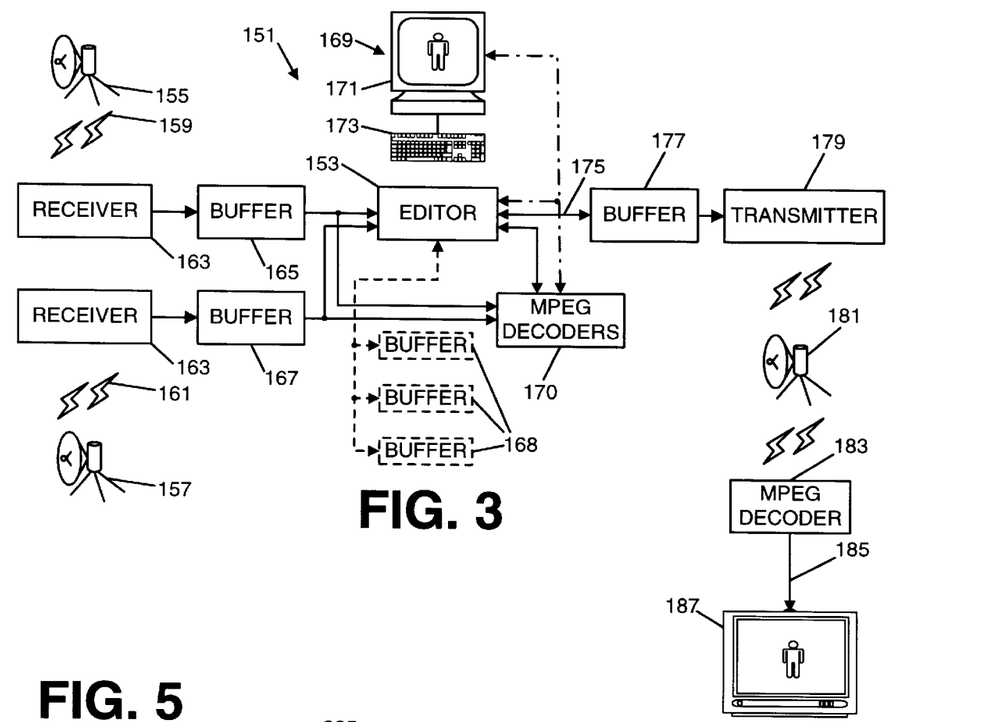
FIG. 3 is an illustrative diagram showing an application for the editor of FIG. 2, namely, in a real-time system for cutting and splicing together two satellite feeds, and forming a composite feed for re-transmission to a satellite, such as might be performed by a television network.

FIG. 3 illustrates a typical application 151 for an editor 153 which implements principles of the present invention, namely, a real-time application which involves mixing compressed signals from two satellite feeds. FIG. 3 illustrates two satellites 155 and 157 which transmit two different compressed image signals, for example, two different football games. The transmissions, represented by reference numerals 159 and 161, are received by one or more receivers 163 and fed to corresponding input buffers 165 and 167. Alternatively, the two inputs to the system could be outputs from two digital television cameras, i.e., cameras which output digitally compressed image sequences. Without leaving the compressed domain, or performing an IDCT, the preferred editor 153 operates under the control of a user interface 169, to mix the two compressed images signals as desired. Preferably, the system includes (in parallel with the editor and associated buffers 168) one or more MPEG decoders 170 which are used to display images using the user interface. For example, the user interface can include one or more monitors 171 and a keyboard 173, and can concurrently display several image windows such as one corresponding to each transmission 159 and 161, as well as to an output 175 of the editor. With the user interface, a person controlling the editor 153 can cause the editor to switch the output between several image signals, such as between the two football games, or to mix commercials with a live satellite transmission, etcetera.

The output 175 is fed to an output image buffer 177, and from there to a transmitter 179 for transmitting a composite satellite signal to satellite 181. The signal can then be received by a local MPEG decoder 183, for example, at a cable company receiving station, and transmitted via cable 185 to individual television subscribers, represented by the reference numeral 187.

It should be understood that the application just discussed, namely, which involves satellite feeds, is but one application for the preferred editor, which may be applied elsewhere as well, for example, in post-production houses, or as software for use upon individual personal computers for graphics or video conferencing applications.

With several principle features of the preferred embodiment thus introduced, the preferred embodiment will now be discussed in additional detail.

II. Editing Compressed Image Sequences.

A. General.

As indicated earlier, the preferred embodiment uses frame conversions as necessary to alter temporal dependencies in a manner consistent with any desired manipulation. Below, two specific manipulations will be discussed, namely, cutting and splicing together of two image sequences and conversion of an image sequence to reverse play. The invention, however, may be applied to any manipulation of images to rearrange temporal order with respect to other images (including arranging images to be ordered next to new images, such as splicing).

In one MPEG compression scheme, an I frame includes only discrete cosine transform ("DCT") coefficients for every 8×8 pixel block of an image. Transforms (such as a DCT) are performed in image compression typically to shorten length of an image sequence (e.g., the memory or transmission bandwidth required for the image). The result of a DCT is typically another 8×8 matrix, where each value represents a frequency of intensity change within the corresponding pixel block, on a row basis and on a column basis. Very high frequency values, which could represent regular and quick intensity variations in the 8×8 pixel block, are typically presumed to be less important than lower frequency values, and are found at the bottom right of the 8×8 DCT matrix; via a step known as "quantization," these values are sometimes scanned and processed to become zeros. Each 8×8 DCT matrix is then encoded using a scheme which zig-zag scans the matrix, in a regular pattern from upper left to bottom right, i.e., such that the values assumed to be less important are last, and preferably the coding for each matrix ends with a variable-length string of zeros. This variable-length string is then replaced with an escape character, and each quantized, encoded DCT matrix then becomes a variable-length string of DCT coefficients, followed by an escape character which indicates remaining entries of the DCT matrix are zeros.

P frames use motion vectors as well as DCT coefficients. More particularly, each block in a P frame is searched against an image corresponding to prior P or I frame to determine a closest match (within a position window of typically 31 pixels in any direction). The resultant motion vector, identifying the best fit, is then encoded. In addition, the pixel block of the current frame and the best fit pixel block of the prior frame are compared to produce difference values, and it is these difference values which are encoded in the DCT format, as just described in connection with the I frames. In this manner, a P frame is predicted based upon a prior I or P frame and is dependent upon decoding of the prior I or P frame for image domain reconstruction. Whether a compressed image is a I, P or B frame is determined by a field in header information for each frame, which a decoder uses to determine proper decompression procedure.

B frames can depend upon both a prior I or P frame as well as a subsequent I or P frame. Since objects in image sequences frequently change gradually over several images, the average of preceding and subsequent frames frequently provides a good estimate for a current frame, and requires the fewest encoded DCT coefficients (and the smallest amount of encoded prediction difference data for image recreation). Typically, a B frame includes motion vector representations for both the immediately prior I or P frame and the immediately subsequent I or P frame, as well as DCT coefficients for difference values from an averaged pixel block produced from these other frames.

The preferred editor modifies I, P and B frames to the extent necessary to reorder the display sequence of associated images. For example, the following compressed sequence of frames represents temporal ordering of images for one group of pictures ("GOP");

$I_1B_2B_3P_4B_5B_6P_7B_8B_9I_{10}$.

The temporal order of images, indicated by subscript numbers, would require re-ordering of the I, P and B frames in compressed format because, as mentioned, a decoder generally needs subsequent P or I frames to decode a B frame. Consequently, the transmitted (or coded) order for the sequence indicated above would be as follows;

$I_1P_4B_2B_3P_7B_5B_6I_{10}B_8B_9$.

1. Image Splicing.

In a first hypothetical, the image sequence $I_1B_2B_3P_4B_5B_6P_7B_8B_9I_{10}$ is to be cut and spliced after frame 5 to frame 7 of a second image sequence, identified first in temporal order and then in transmission order as follows;

$I_AB_BP_CB_DP_EB_FP_GB_HB_II_J$, $I_AP_CB_BP_EB_DP_GB_FI_JB_HB_I$.

That is to say, one desires to form a third image sequence with frames identified as follows;

$I_1\boldsymbol{\mathit{\underline{P_4B_2B_3}}}P_7\boldsymbol{\mathit{\underline{B_5}}}B_6I_{10}B_8B_9-I_AP_CB_BP_E B_D\boldsymbol{\mathit{\underline{P_G}}}B_F\boldsymbol{\mathit{\underline{I_JB_H B_I}}}$, where frames appearing in bold, italicized, underlined font are to be kept, with the remaining frames being discarded. Conventionally, such a splice presents problems in the compressed domain, because in this hypothetical, frame $B_5$ of the first sequence may depend upon frame $P_7$, no longer present, and frame $P_G$ depends upon frames $P_E$, $P_C$ and $I_A$, also no longer present. Consequently, the combination of frames discussed just above is typically not possible without completely decompressing each image sequence.

However, contrary to conventional wisdom, the preferred editor in this example performs processing without converting each of the two image sequences to the image domain prior to performing editing. In particular, the first image sequence is first processed by converting frame $B_5$ to remove its dependencies upon any subsequent frames, e.g., frame $P_7$. The editor, via a "transcoding" process described below, determines that for each block of frame $B_5$ that depends upon a block of frame $P_4$ (and $P_7$), it should add an estimate of ½ the DCT coefficients for the block identified by motion vectors pointing to frame $P_4$, while subtracting ½ of the DCT coefficients for the block identified by motion vectors pointing to frame $P_7$, and removes dependencies attached by frame $B_5$ to future frames. The editor, also identifying that frame $P_G$ depends upon frames $P_E$, $P_C$ and $I_A$, uses transcoding to convert each DCT block of frame $P_G$ to reform frame $P_G$ into an I frame, e.g., $I_G$, by first converting frame $P_C$ to an independent frame, $I_C$, then converting frame $P_E$ to an independent frame, $I_E$. Represented in transmission order, each of the first and second sequences of images then appears as follows;

$I_1\boldsymbol{\mathit{\underline{P_4B_2B_3}}}P_7\boldsymbol{\mathit{\underline{B'_5}}}B_6I_{10}B_8\ B_9$, and $I_AP_CB_BP_EB_D\boldsymbol{\mathit{\underline{I_G}}}B_F\boldsymbol{\mathit{\underline{I_JB_H B_I}}}$.

Given the two sequences identified above, frames that are not to be included in the spliced image can simply be discarded, with simple ordering of the remaining compressed frames resulting in the following, MPEG-compliant sequence;

$I_1P_4B_2B_3 - I_G - B'_5 - I_JB_HB_I$.

Figure 4:
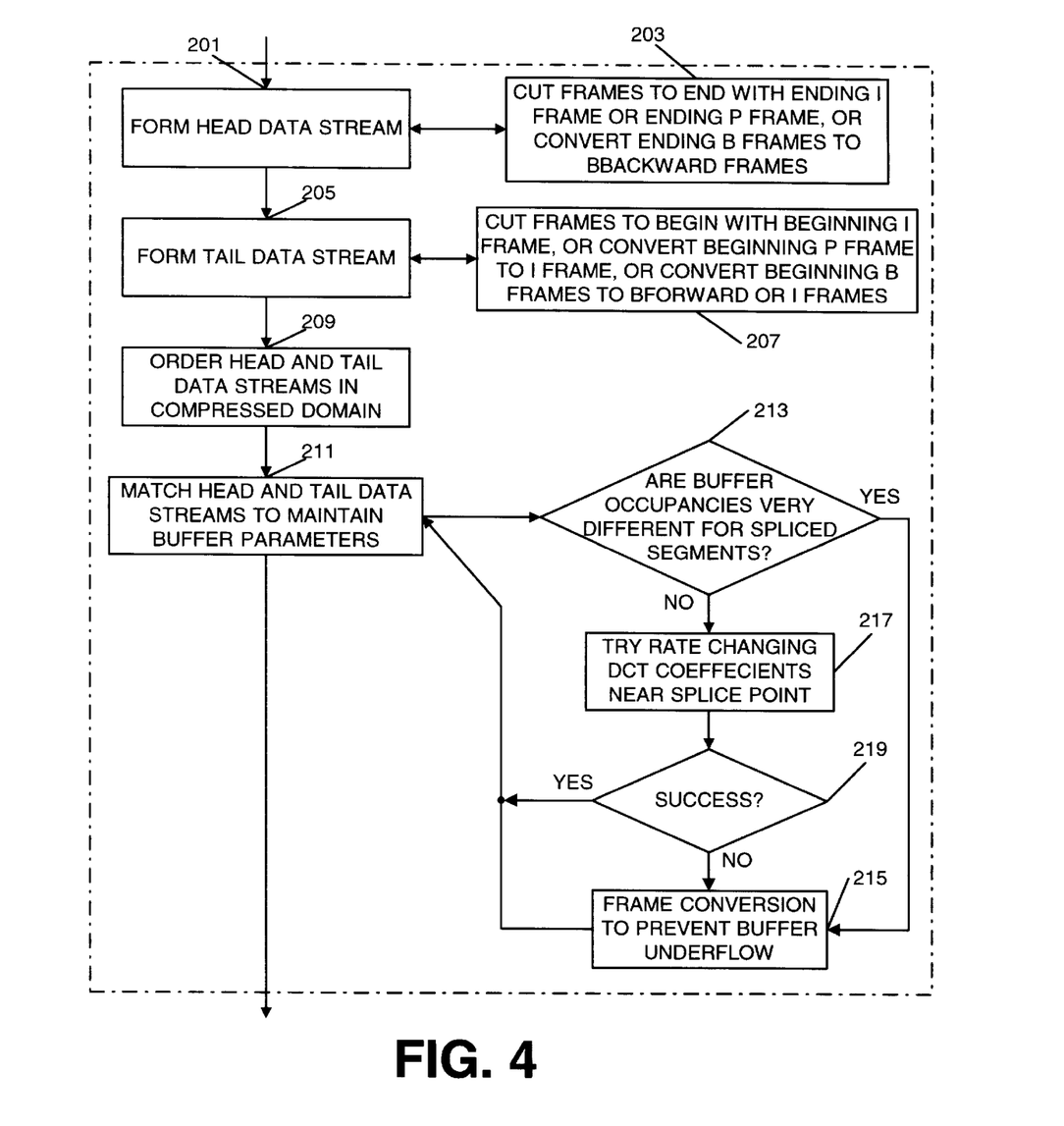
FIG. 4 is a software block diagram illustrating a typical editing application using the preferred embodiment, namely, cutting and splicing together of two moving picture sequences to form a third, composite moving picture sequence.

Cutting and splicing together two image sequences is further illustrated with respect to FIGS. 2 and 4. Returning to FIG. 2, it is noticed that the first set 111 of MPEG frames identifies five frames which are to be retained, namely, the italicized, underlined sequence ". . . IPBB and B" [the fifth P frame is actually the sixth frame in play-order]. The editor identifies that the frames which are to be retained do not have motion vectors which point to frames which are to be cut (as would be the case, for example, if the ending frame were a B frame). Accordingly, the editor may simply use the sequence ". . . IPBB B" without any frame conversions. On the other hand, the second set 113 of MPEG frames identifies that frames "PBBPI . . . " are to be retained. The editor, in as part of its initial processing steps, identifies that the first three frames, namely a P frame and two B frames, depend upon frames which will be cut and that frame conversions are necessary if the desired manipulation is to be performed. First, the P frame depends upon a prior P frame which, in turn, depends upon a prior I frame. Second, the B frames depend upon both the first, retained P frame and the prior P frame, which in turn depends upon the preceding P and I frames. These dependencies are shown by the following description, where the frames are seen in transmission order and frames to be retained are showed in bold, italicized text:

As identified in FIG. 2 by reference numeral 123, a frame conversion block first converts the P frame to an I frame, and then converts the B frame to remove all dependencies upon prior frames (i.e., the new frame being designated B' or "B-forward").

The cutting and splicing together of two image sequences is better illustrated by FIG. 4. It will be assumed that these image sequences have been dequantized and expanded to motion vector- ("MV-") and discrete cosine transform- ("DCT-") based representations. First, the editor proceeds to form a head data stream by identifying any cut points in a first sequence of frames, as identified by a processing block 201 of FIG. 4. If any frames have forward-looking dependencies, i.e., they are B frames that have pointers to P or I frames that will be cut, the editor proceeds to convert such ending B frames to B-backward frames, such that no temporal dependencies will be affected by the desired cut. This operation is represented by the reference numeral 203 in FIG. 4.

The editor also proceeds to form a tail data stream by a similar process, as represented by processing blocks 205 and 207 of FIG. 4. In this case, however, lead frames which have backward temporal dependencies must be converted to remove those dependencies. Accordingly, if the lead frames include a P frame which points to frames which are to be cut, that P frame is converted to an I frame. Similarly, if lead frames include B frames, those frames are processed to become B-forward frames (B frames having no backward dependencies). In this regard, while FIG. 2 shows frames in transmission order, cutting and splicing according to the present invention can be equivalently performed by cutting either play order or transmission order.

Once the head data stream and tail data streams have been prepared, they are ordered with respect to one another (as indicated by the reference numeral 209) to produce a composite sequence, and rates are matched to prevent data underflow or overflow. If buffer rates are very different for the original and spliced segments, then another frame conversion can be performed upon the composite sequence to match bit rates, as indicated by blocks 211, 213 and 215 of FIG. 4. Normally, however, it is expected that bit rates can be suitably adjusted by several different methods, including by rate-adjusting transition frames, as represented by blocks 217 and 219 of FIG. 4. This rate-adjusting simply reduces or increases the amount of data in the DCT representations for a transition frame to match original parameters, for example, by re-quantizing DCT coefficients, adding zeros ("bit-stuffing") or by reducing the amount of high frequency data in a transition frame according to known methods. One such method, for example, is discussed in U.S. Pat. No. 5,534,944 to Egawa et al.

2. Reverse Play.

In a second hypothetical case, it is to be assumed that one desires to play the sequence of images 1–10 in reverse order. In that case, the sequence play order would be as follows;

$I_{10}B_9B_8P_7B_6B_5P_4B_3B_2I_1$.

However, such reverse play conventionally creates problems, because the frame $P_7$ is dependent upon frames $P_4$ and $I_1$, not frame $I_{10}$, and because frame $P_4$ is dependent upon frame $I_1$, not frames $P_7$ or $I_{10}$. As a result, the image sequence (1) above must typically be completely decoded, with individual images then reordered in the image domain, and then the reversed sequence must be re-compressed.

The preferred editor in this second hypothetical case processes compressed frames by converting P frames to I frames as necessary. The editor processes frame $P_4$ to (a) combine its DCT coefficients with those of frame $I_1$, in a manner described below, and (b) uses the motion vectors for frame $P_4$ in performing this combination, so that motion vectors are no longer necessary; the result is a new compressed frame, $I_4$. Similarly, frame $P_7$ is processed to create new compressed frame $I_7$. The editor processes B frames in the compressed domain to then alter its motion vectors, i.e., forward vectors become backward vectors and backward vectors become forward vectors, without altering DCT coefficients for the B frames at all. The compressed, reverse-play sequence would appear in temporal order as follows;

$I_{10}B_9B_8I_7B_6B_5I_4B_3B_2I_1$, and would appear to be suitable for storage or transmission in the following order;

$I_{10}I_7B_9B_8I_4B_6B_5I_1B_3B_2$.

Additional processing can further be performed to compress this sequence. In particular, frame $I_7$ following reorder may be converted back to a P frame, this time dependent upon frame $I_{10}$, and frame $I_4$ can be converted to a P frame dependent both upon frame numbers 10 and 7, for example.

Figure 5:
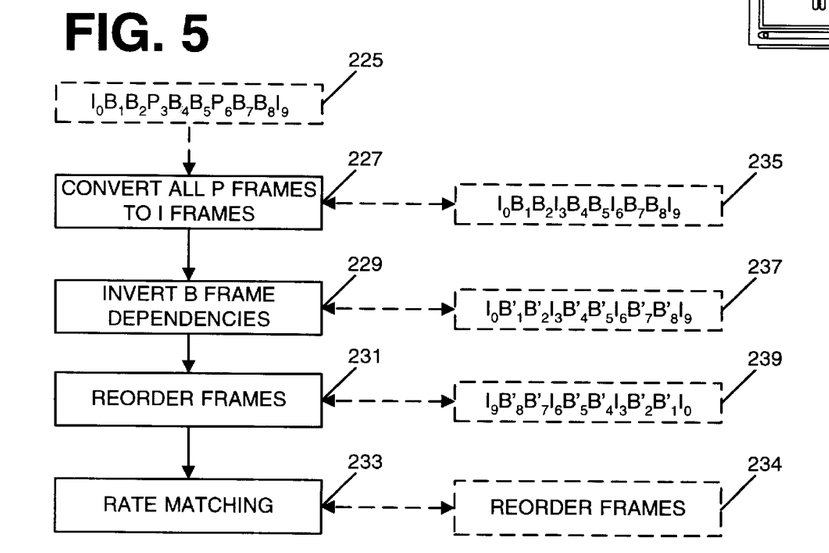
FIG. 5 is a software block diagram indicating a typical editing application using the preferred embodiment, namely, processing a moving picture sequence in the compressed domain to provide reverse-play.

Converting a sequence to reverse-play order is indicated in block diagram by FIG. 5. In particular, a sequence of interest 225 is first processed to convert all P frames to I frames, as indicated by function block 227 and a compressed frame data set 235, seen at the right of FIG. 5. In this example, frames are illustrated in play sequence, and are numbered from 0 to 9 to indicate original play order. Second, B frames are processed to switch their pointers to their two anchor frames (i.e., forward motion vectors become backward motion vectors, and vice-versa), as indicated by function block 229 and compressed frame data set 237. Third, the frames are reordered in the desired play sequence, as indicated by box 231 and a compressed frame data set 239. As illustrated by the compressed frame data set 239, the frames have now been reordered, such that the frame that was originally last (frame 9) comes first, and so on. Finally, bit rates are examined for the new sequence with additional rate change performed as necessary to maintain rate parameters, as indicated by function block 233. If desired, quantization and rate matching can be performed prior to frame reordering, as indicated by function block 234 of FIG. 5.

Hardware and instructions for implementing these functions typically include a computer (which may be embedded in special purpose editing equipment) and associated buffers, together with a memory for multiple frames or a coded bit stream (e.g., a compressed multiple frames) for temporary use in reordering frames with respect to the same or new data sequences, an input mechanism and an output mechanism (such as a CDROM, satellite feed, memory feed, or other system), and special purpose software which can be loaded onto the computer or provided by a manufacturer of a special purpose editor.

3. Alternative Embodiment; Conversion of Key Frames To The Image domain.

As indicated earlier, image reordering can also be performed in a manner that does not violate temporal dependencies by identifying key frames, converting those frames to the image domain and, then, reprocessing those images in any desired manner. For example FIG. 2 identified a splicing application where the sequence ". . . BBIPBPBBPI . . . " is to be cut, and the latter five frames to be appended to another image sequence. If the frames "PBBPI" were simply cut, in this hypothetical, the first three frames could no longer be accurately decoded because they would all depend upon a prior, missing I or P frame. While the preferred embodiment calls for frequency domain conversion of these frames to remove such dependencies, it would also be possible to entirely decompress as little as four entire frames only, and then perform three re-conversions to achieve the desired splicing. For example, prior to any cut, the frames "PBB . . . " could be decoded to the image domain, and then recoded as "IPB . . . " frames, for example. Similarly, implementation of reverse-play could be effected by inverting B frame dependencies, converting P frames to the image domain, reordering these frames, and then reconverting these frames as P frames based upon the new temporal order of frames. All of these variations are viewed as within the spirit of the present invention.

B. Specific Frame Conversions.

1. P to I Frame Conversion.

Figure 6:
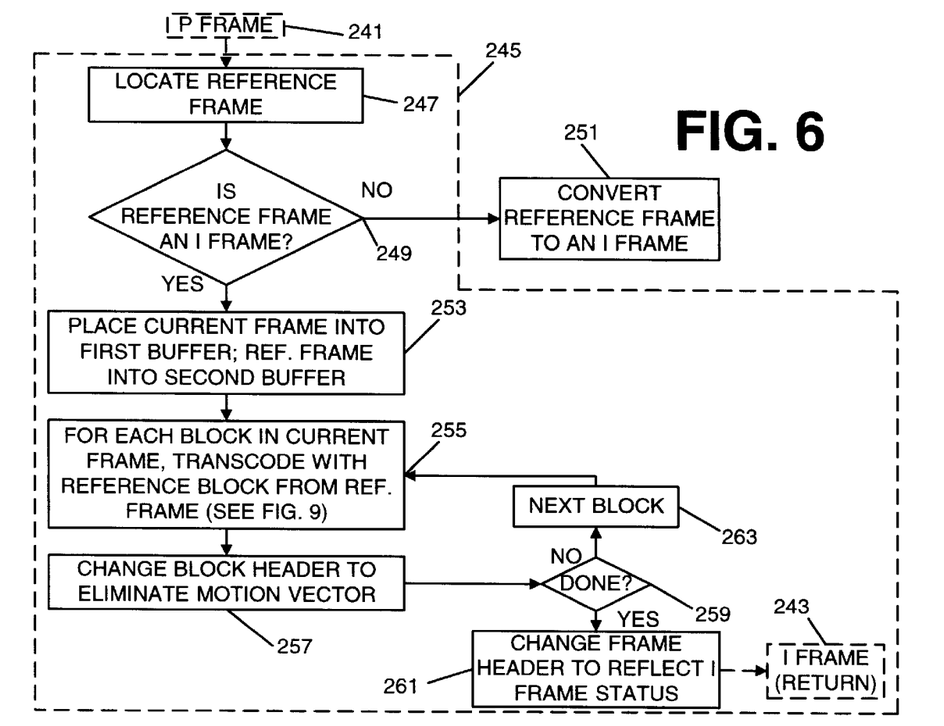
FIG. 6 is a software block diagram indicating actions in converting a P frame to an I frame.

Conversion of a P frame 241 to an I frame 243 is indicated in block diagram form by FIG. 6. A group of actions, found within a dashed line 245, are preferably implemented as a subroutine for severing temporal dependency between a current frame and a reference frame; in this regard, a reference frame identified by the current frame is first located, and a determination is made whether the reference frame is an I frame (all as indicated by process block 247 and decision block 249). For example, if a frame P7 which is to be transcoded is discovered to depend on frame P4 which in turn depends on frame I1, a nested transcoding subroutine is then called using frame P4 as the current frame and frame I1 as the reference frame, to convert frame P4 to independent frame I4. This process, indicated by a function block 251 of FIG. 6, is performed in as many nested loops as necessary to yield an I frame as reference frame for use with the P frame 241. In the hypothetical involving frames P7, P4 and I1, a dominant subroutine of the editor uses frame P7 as the current frame and frame I4 as the anchor frame, to yield frame I7.

The subroutine 245 processes each current P frame and a reference I frame by first loading these frames into associated buffers, and by processing each DCT block within the P frame to remove its dependency upon the reference frame, as indicated by function blocks 253 and 255 of FIG. 6. Removal of dependency upon a reference frame, referred to herein as "transcoding," is explained in greater detail below with reference to FIGS. 9 and 10. Once a macroblock has been processed to not refer to other frames, a header associated with the block is processed by removing a bit indicating presence of a motion vector, as indicated by block 257 of FIG. 6. If all DCT blocks of the current frame have been processed (or at other times if desired), the frame header is processed to reflect new status of the frame as an I frame, and the subroutine is terminated, as indicated by decision block 259 and function block 261; if not, the subroutine selects a next DCT block of the P frame 241 for processing in a like manner, until all blocks are processed, as indicated by function block 263.

2. B to B' Frame Conversion.

Figure 7:
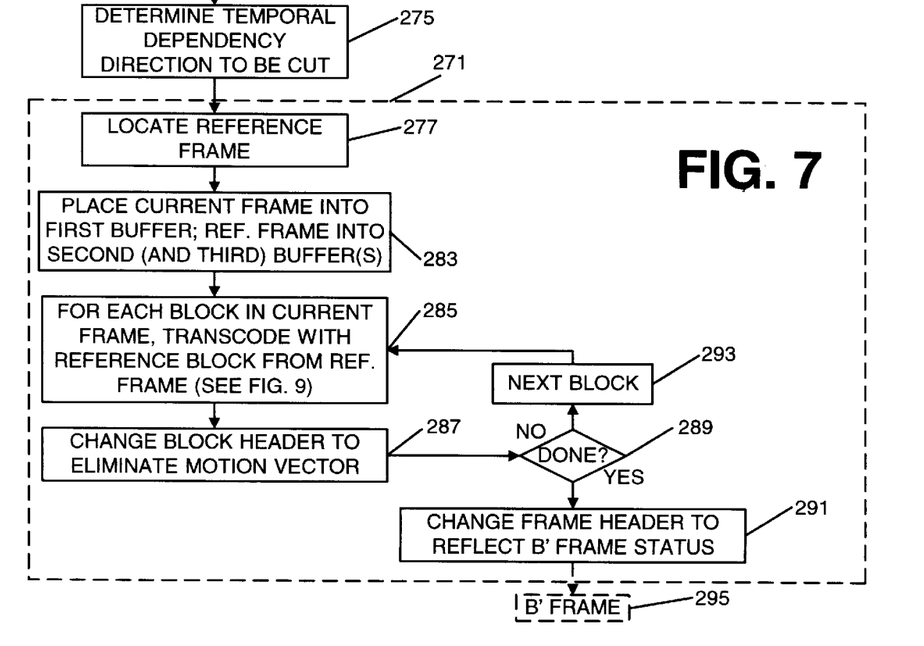
FIG. 7 is a software block diagram indicating actions in converting a B frame to a B' frame having only forward or backward dependencies, but not both.

Conversion of a B frame to a B' frame is illustrated using FIG. 7, and the conversion employs a subroutine 271 which in implementation is similar to that described above in connection with FIG. 6. In particular, a B frame 273 is processed by the editor to determine a direction of temporal dependency that is to be severed, as indicated by reference numeral 275; this direction will depend upon the desired frame manipulation. In some cases, a dependency upon future frames is to be severed, and the B frame is converted essentially to a B' frame (e.g., for a B frame having only one direction of temporal dependency). In other cases, a dependency upon past frames is to be cut, in the same manner. Finally, depending upon the desired manipulation, it may be desired to segregate one B frame only, in which case the subroutine 271 will be called twice, first to in effect convert the B frame to a B' frame, and second, to convert the B' frame to an I frame. As can be seen from FIG. 7, the subroutine is relatively straight forward, and employs blocks 277–289 and 293 which are identical to functions (247–259 and 263) described above in connection with FIG. 6; unlike the P frame to I frame conversion, however, it is not necessary to convert all referenced frames to an I frame format, since a B frame may depend upon either a P frame or an I frame. As with the P to I frame conversion, a function block 291 is performed to update frame header information, and the product of the subroutine 271 is a B' frame 295 which has at most only one direction of temporal dependency.

3. I to P Frame Conversion.

A conversion from an I frame to a P frame may be performed either in completing a reverse-play sequence or in performing rate matching, the latter of which will be further described below. In the preferred embodiment, it is expected that performing further quantization upon an I frame should be sufficient to match buffer rates (and thereby prevent buffer underflow or buffer overflow), and that frame conversion should not be necessary for rate matching. Nevertheless, frame conversion may also optionally be used to assist with rate matching.

Converting an I frame to a P frame in the DCT domain is rendered difficult because it is difficult to search for a best fit for a particular DCT block when a prior reference frame is already encoded in discrete 8×8 DCT blocks. The preferred embodiment avoids this difficulty by directly matching DCT coefficients for a current block against an entire, discrete block for a reference frame. While such might not represent the best fit with a prior image, per se, it is expected that this procedure should provide for a sufficiently close fit to reduce data rates to an acceptable amount. If additional computational power is available, other methods may also be used to calculate a highly accurate motion vector.

Figure 8:
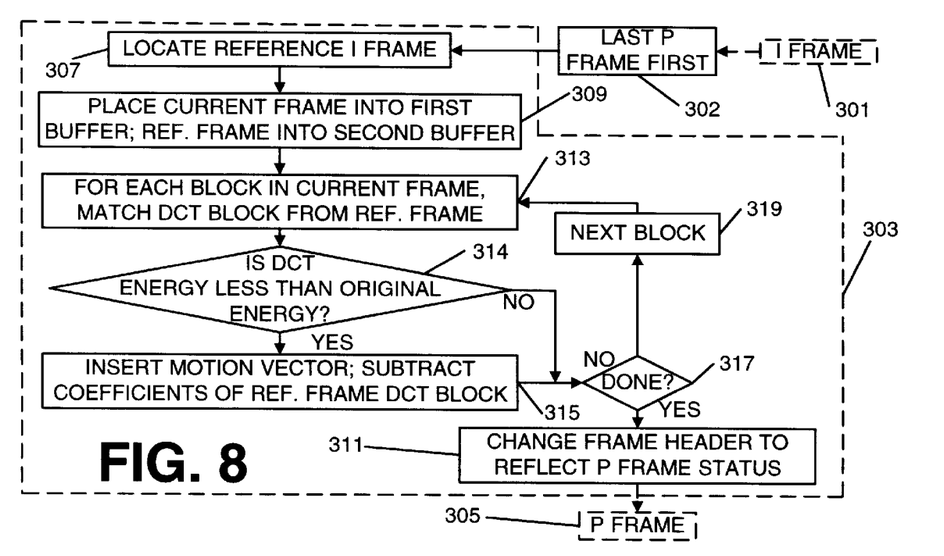
FIG. 8 is a software block diagram indicating actions in converting an I frame to a P frame.

As seen in FIG. 8, an I frame 301 is processed using a second subroutine 303 to yield a P frame 305. First, a suitable anchor frame is selected from among available I frames, as indicated by function block 307. A problem similar to a recursive problem identified (in connection with the I to P and B to B' conversions), above, exists in some instances, but is handled outside of the functions illustrated in FIG. 8. For example, in a reverse play sequence, where perhaps a series of I frames are reordered and then converted to P frames, the recursion problem is addressed simply by processing the P frame first which is temporally last (as indicated by function block 302), i.e., such that the reference frame will always be selected to be an I frame.

The editor places the I frame to be converted into a first buffer and the reference I frame into a second buffer (per the processing block identified by reference numeral 309), and performs processing, block-by-block in the current frame, to identify a close match with a DCT block in the reference frame. If the resulting DCT energy is less than the original DCT energy for the block, a motion vector is defined and its presence identified in a block's associated header information, and residual DCT coefficients determined by subtracting DCT coefficients from the current block from the reference block. This processing is performed until all blocks have been processed, whereupon frame header information is updated, as identified by block 301, to reflect new status of the frame as P frame 305. The block-by-block processes just described are identified by numerals 313–319 in FIG. 8.

4. Transcoding.

Motion compensation of compressed video by exploiting temporal redundancies implies predicting each 8×8 spatial domain block x of the current picture by a corresponding reference block x' from a previous or future picture and encoding the resulting prediction error block e=x−x' by using a DCT algorithm. In some of the pictures (e.g. B-pictures), blocks can be estimated from either past or future reference blocks, or both of them. See, Coding of Moving and Associated Audio. Committee Draft of Standard IS011172, ISO/MPEG 90/176, December 1990; Video Codec for Audio Visual Services at px64 Kbits/s, CCITT Recommendation H.261, 1990; and D. le Gall, MPEG: A Video Compression Standard for Multimedia Applications, Commun. of the ACM, Vol. 34, No. 4, pp. 47–58, April 1991. For the sake of simplicity, the discussion below shall assume that only the past is used (e.g., P-pictures), and the extension is straightforward.

The best matching reference block x' may not be aligned to the 8×8 block of the current picture. In general, the reference block will intersect with at most four neighboring spatial domain blocks, which are henceforth denoted $x_1$, $x_2$, $x_3$, and $x_4$, that together form a 16×16 square, where $x_1$ corresponds to northwest, $x_2$ to northeast, $x_3$ to southwest, and $x_4$ to southeast. The capitalized, italicized designation X will be used to refer to the DCT representation of these blocks. The various blocks, x, x', $x_1$, $x_2$, $x_3$, and $x_4$ are also respectively illustrated in FIG. 10 by the reference numerals 325, 327, 329, 331, 333 and 335, and are separated from a block diagram describing associated process steps by a dashed line 337.

Figure 10:
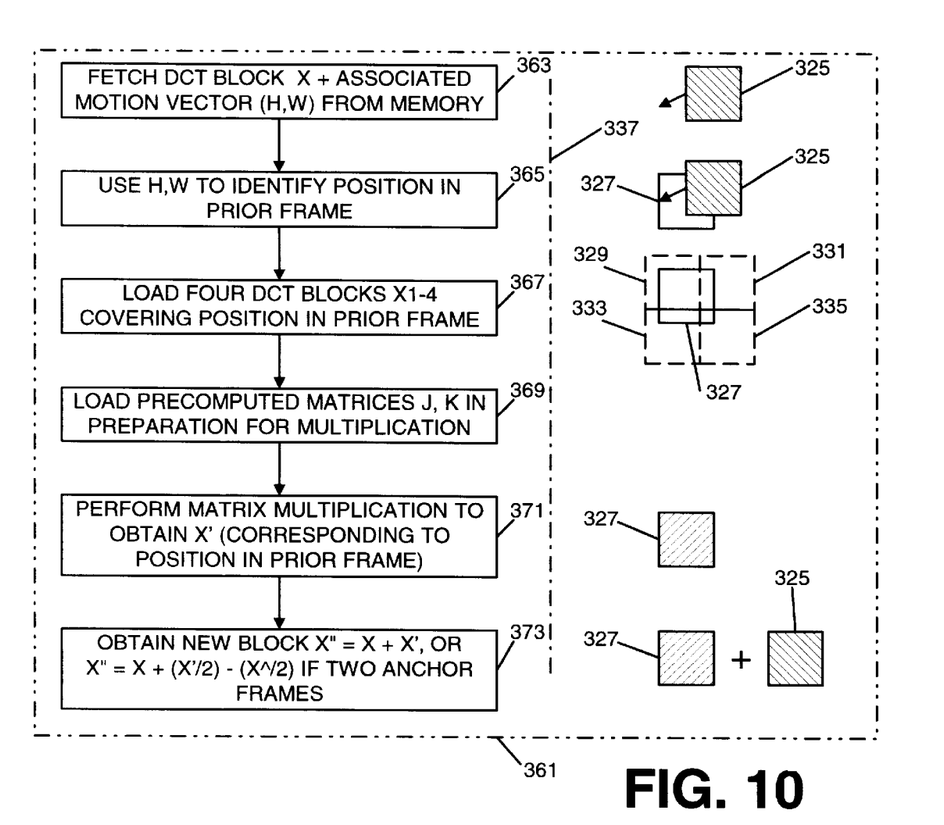
FIG. 10 is a block diagram illustrating a transcoding process, which revises DCT coefficients for a current frame to eliminate dependencies upon a reference frame.

The goal of transcoding is to compute a new DCT X'' of the current block from the given DCT X, and the DCT's $X_1$, ..., $X_4$. Because DCT's may be combined simply by adding their coefficients, X''=X'+X, the main problem that remains is that of calculating X' directly from $X_1$, ..., $X_4$.

The intersection of the reference block x' with $x_1$ form an h×w rectangle (i.e. having h rows and w columns), where 1≤h≤8 and 1≤w≤8. This fact implies that the intersections of x' with $x_2$, $x_3$, and $x_4$ are rectangles of sizes h×(8−w), (8−h)×w, and (8−h)×(8−w), respectively.

Following S. F. Chang and D. G. Messerschmitt, Manipulation and Compositing of MC-DCT Compressed Video, IEEE Journal On Selected Areas of Communications, Vol. 13, No. 1, pp. 1–11, 1994, and S. F. Chang and D. G. Messerschmitt, A New Approach to Decoding and Compositing Motion-Compensated DCT Based Images, Proc. ICASSP 1993, Minneapolis, April 1993, it is readily seen that x' can be expressed as a superposition of appropriate windowed and shifted versions of $x_1$, ..., $X_4$, i.e.

$$x' = \sum_{i=1}^{4} c_{ij} x_i c_{i2}$$

where $c_{i,j}$, i=1, ..., 4, j=1,2, are sparse 8×8 matrices of zeroes and ones that perform window and shift operations accordingly. The work of Chang and Messerschmitt ibid. suggests use of the distributive property of matrix multiplication with respect to the DCT. Specifically, because S'S=I, the equation indicated above may be rewritten as:

$$x' = \sum_{i=1}^{4} c_{ij} S^t S x_i S^t S c_{i2}.$$

By pre-multiplying both sides of this equation by S, and post-multiplying by S', one obtains:

$$X' = \sum_{i=1}^{4} C_{ij} X_i C_{i2}.$$

where $C_{ij}$ is the DCT of $c_{ij}$. Chang and Messerschmitt ibid. proposed pre-computation of the fixed matrices $C_{ij}$ for every possible combination of w and h, and computation of X' directly in the DCT domain using the equation indicated above. Although most of the matrices $C_{ij}$ are not sparse, computations can still be saved on the basis of typical sparseness of $\{X_i\}$, and due to the fact the reference block might be aligned in one direction, i.e. either w=8 or h=8, which implies that the right-hand side of the equation above contains two terms only; or in both directions w=h=8, in which case x'=$x_1$ and hence no computations at all are needed.

The computation of X' is performed even more efficiently by using two shortcuts. First, some of the matrices $c_{ij}$ are equal to each other for every given w and h. Specifically, $$c_{11} = c_{21} = U_h \stackrel{\Delta}{=} \begin{pmatrix} 0 & I_h \\ 0 & 0 \end{pmatrix}$$

$$c_{12} = c_{32} = L_w \stackrel{\Delta}{=} \begin{pmatrix} 0 & 0 \\ I_w & 0 \end{pmatrix}$$

where $I_h$ and $I_w$ are identity matrices of dimension h×h and w×w, respectively. Similarly, $$c_{31} = c_{41} = L_{8-h}$$

and $$c_{22} = c_{42} = U_{8-w}.$$

A second shortcut that saves computational resources is that, rather than fully pre-computing $C_{ij}$, it is more efficient to leave these matrices factorized into relatively sparse matrices. This scheme is more fully described by U.S. Pat. No. 5,708,732, which is assigned to the same entity as is the present application, and which is hereby incorporated by reference as though reproduced in its entirety herein.

The best way to use the two observations mentioned above is the following:

First, the following fixed matrices are pre-computed $$J_i \Delta U_i (MA_1 A_2 A_3)^t,$$

i=1,2, . . . , 8 and $$K_i \Delta L_i (MA_1 A_2 A_3)^t,$$

i=1,2, . . . , 8.

These matrices are very structured and therefore, premultiplication by $K_i$ or $J_i$ can be implemented very efficiently. Next, X' is computed using the expression $$X' = S \begin{bmatrix} J_h B_2^t B_1^t P^t D(X_1 DPB_1 B_2 J_w^t + X_2 DPB_1 B_2 K_{8-w}^t) + \\ K_{8-h} B_2^t B_1^t P^t D(X_3 DPB_1 B_2 J_w^t + X_4 DPB_1 B_2 K_{8-w}^t) \end{bmatrix} S^t$$

which can easily be obtained from the first equation set forth above, or by its dual form $$X' = S \begin{bmatrix} (J_h B_2^t B_1^t P^t DX_1 + K_{h-8} B_2^t B_1^t P^t DX_3) DPB_1 B_2 J_w^t + \\ (J_h B_2^t B_1^t P^t DX_2 + K_{h-8} B_2^t B_1^t P^t DX_4) DPB_1 B_2 K_{8-w}^t \end{bmatrix} S^t,$$

depending on which one of these expressions requires less computations for the given w and h.

While this description indicates how transcoding is performed to yield a motion-compensated reference block X', further processing must be performed (which is different) for each of a P frame to I frame conversion and B frame to B' frame conversion. In particular, the transcoding process for a P frame to I frame conversion (see function block 255, FIG. 6) utilizes simple addition between a current DCT block and a motion compensated block X' from the reference frame, as indicated by function block 373 of FIG. 10. With B frame to B' frame conversion, however, it will be recalled that the DCT X for the current frame represents a difference over either one or two other frames. Therefore, if, in performing transcoding, it has been determined that a DCT X points to only one other frame, then the addition of X to X' is treated exactly as was the case for a P frame to I frame conversion. On the other hand, if it has been determined that a DCT X represents difference between the current frame and an average of two other frames, then the new DCT must be computed to have un-weighted (e.g., full, as opposed to one-half) temporal dependency upon an unaffected reference frame; the new DCT X" is therefore computed by adding ½X' to X and subtracting ½X^as indicated by function block 373 of FIG. 10.

Figure 9:
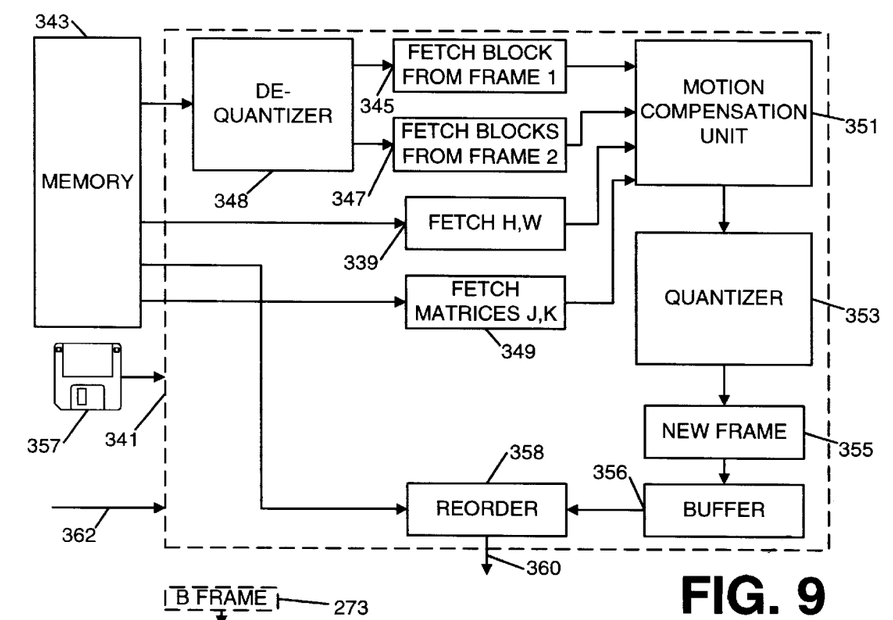
FIG. 9 is a block diagram illustrating systems layout of an editor from FIG. 3.

Transcoding of a de-quantized DCT 8×8 block which corresponds to the present picture, to incorporate information from a reference frame (and therefore eliminate need for temporal dependency upon the reference frame) is indicated with respect to FIGS. 9 and 10. FIG. 9 presents a block diagram indicating layout of the preferred editor, whereas FIG. 10 presents a block diagram of processes used in performing transcoding.

As was identified above in connection with FIG. 6 (conversion of P frame to I frame) and FIG. 7 (conversion of B frame to B' frame, i.e., either a Bforward frame or Bbackward frame), transcoding is performed in each case to eliminate dependency upon another particular reference frame. For example, if a bidirectional (B) frame is to be converted to a B' frame having only backward dependency (making its dependence similar to a P frame), processing indicated in FIG. 9 is performed to eliminate dependency upon a future frame (but dependencies upon a prior, I frame or P frame are not necessarily altered). In the discussion which follows, it will be assumed that the temporal dependency to be severed is in a backward direction, though the discussion equivalently applies for severing temporal dependencies in the forward direction.

As indicated by FIG. 9, in processing each DCT block of the current frame, a module 339 of the editor 341 fetches a motion vector h,w from memory 343, while second and third modules 345 and 347 fetches a DCT block for the current frame and the four 8×8 DCT blocks, $X_1$, $X_2$, $X_3$, $X_4$, which are part of a reference I or P frame and which have been passed through a de-quantizer 348; if the reference frame is a P frame, then the reference frame must be converted to an I frame. For a reference frame which is an I frame, a fourth module 349 uses h and w to fetch the required J, K matrices, and thereby precalculate a set of fixed matrices. Once the proper region of the reference frame is located, the four 8×8 DCT blocks that comprise the information necessary to establish an anchor region within the reference frame are converted to a single 8×8 DCT block X' by a processing unit 351 for carrying out the inverse motion compensation calculation. The block thus determined is then combined (via an adder) with a 8×8 DCT block for the current frame, to incorporate the difference between the single DCT block from the anchor region and produce a new DCT block which is independent of the reference image frame. The various modules and units of the editor described are preferably implemented as instructions stored on machine readable media 357, such as software which can be run on a computer workstation having sufficient memory and image processing support hardware, or special purpose image editing machines. The instructions operate in the manner indicated by the block diagram 361 of FIG. 10, and perform processing functions 363–373, in the manner which have been described above.

Once all blocks have been processed, a new frame 355 is produced by the editor 341. This new frame 355 is output to a quantizer 353 as part of a converted frame to yield a new DCT block which has been compensated to remove temporal dependencies. A frame recording and output module 356 can store modified frames in a buffer 358, for temporal re-ordering, and then output both original frames from the memory 343 and converted frames from the buffer 358 in whichever temporal order is desired, responsive to user commands 362 which have been supplied to the editor.

III. Rate Control.

MPEG applications often use a constant bit rate, for example, such as where video images are stored on compact disk, with information being read at a constant rate of 1.5 megabits per second. It should be apparent that each of the I, P and B frames may have an amount of data that varies, depending upon picture content [at the time of encoding, each GOP is formatted to include information defining buffer size for each of these types of frames, and I, P and B buffers may have a variable fill-rate and a variable empty rate]. Furthermore, it will be recalled from the discussion earlier that P frames typically contain a fraction of data contained in I frames (e.g., $\frac{1}{3}^d$) and that B frames typically contain a fraction of data contained in P frames (e.g., $\frac{1}{4}^{th}$). It should therefore be appreciated that to the extent that image processing in the compressed domain converts between different frame types, more or less data can be inserted within an image sequence which cause the associated buffers to be read improperly if not addressed.

Each coded frame contains a parameter which indicates the buffer status of the data stream. The goal of rate control is to ensure that the buffer requirements are satisfied. For example, in the splicing application mentioned above, two coded input image sequences each use the buffer in a predetermined way. The goal of rate control is to rate-adjust the coded image date near the splice point to result in a graceful transition from the buffer usage of the first image sequence to the buffer usage of the second image sequence.

In the preferred embodiment, rate control is performed as indicated in connection with FIG. 4. More particularly, quantizing of frames is performed to prevent decoder buffer underflow, whereas padding a particular frame with tail zeros (e.g., altering the run-length encoded version of each DCT block to use more zeros) is employed as a preferred method of addressing overflow. In severe cases, frame conversion can be performed by converting P frames to I frames, but it is preferred to address rate control using other methods, including quantization, data partitioning and bit-stuffing methods. In effect, detail can be added or sacrificed in transition frames in order to preserve smoothness of processing and avoid buffer errors.

The preferred editor described above provides for an efficient way of manipulating temporal order of images to place then proximate to other images, without having to fully decompress image frames. The preferred editor should therefore find widespread application to editing fields of motion picture, video, and other fields where images are used or transmitted.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

Splicing MPEG Video Streams In The Compressed Domain" by Susie J. Wee and Bhaskaran Vasudev, and Transcoding MPEG Video Streams In The Compressed Domain by Susie J. Wee and Bhaskaran Vasudev are articles provided as part of this application to provide further detail in implementing embodiments of the invention described herein which have been incorporated by reference.

What is claimed is:

1. A method of editing a compressed input image sequence and producing therefrom a compressed output image sequence, the input sequence including at least one group of images (that does not depend upon any other images for reconstruction from a compressed format), the group of images having at least one compressed dependent frame that contains data for reconstructing one image based upon data from a second image in the group of images, said method using a computing device and comprising:
   receiving with the compressed input image sequence;
   using the computing device to convert a dependent frame to a compressed data format that does not depend upon the second image without decompressing all images in the group of images to an image domain;
   editing data using the computing device, by altering temporal order of an image represented by the dependent frame with respect to at least one other image in the sequence; and
   using the computing device to produce the compressed output image sequence from the data which has been edited by the computing device.

2. A method according to claim 1, further comprising using the computing device to produce the compressed output image sequence in a format that is compliant with a Moving Pictures Expert Group ("MPEG") Standard.

3. A method according to claim 1, wherein using the computing device to convert the dependent frame includes:
   determining discrete cosine transform ("DCT") coefficients for the dependent frame; and
   modifying the DCT coefficients to incorporate image data corresponding to the second image, to yield modified DCT coefficients;
   wherein the dependent frame is thereby modified so as to no longer depend upon data values from the second image for decompression.

4. A method according to claim 1, further comprising clipping first and second compressed input image sequences and splicing them together to form a third image sequence.

5. A method according to claim 4, wherein splicing includes:
   clipping a tail frame of the first sequence by converting the tail frame to eliminate any temporal dependencies upon future frames in the first sequence;
   clipping a lead frame of the second sequence by converting the lead frame to eliminate any temporal dependencies upon prior frames in the second sequence; and
   splicing the first and second sequences together to form a third sequence, by ordering an image represented by the lead frame immediately after an image represented by the tail frame.

6. A method according to claim 1, further comprising using the computing device to edit the compressed input image sequence such that the compressed output image sequence represents a reverse-play-order of images represented by the input image sequence.

7. A method according to claim 1, wherein the compressed input image sequence is compliant with a Moving Pictures Expert Group ("MPEG") Standard, including independent ("I") frames, prediction ("P") frames and bidirectional ("B") frames, and wherein using the computing device to convert the dependent frame to a compressed data format includes:
   using the computing device to perform a conversion upon the dependent frame, including one of
      conversion of a P frame to an I frame by removing dependence of the P frame upon data from any other frame,
      conversion of a B frame to a B frame having no dependence upon data from future frames, such that the B frame as converted only depends upon one or more prior frames in the sequence of data, and
      conversion of a B frame to a B frame having no dependence upon data from prior frames, such that the B frame as converted only depends upon one or more future frames in the sequence of data.

8. A method according to claim 1, wherein using the computing device to convert the dependent frame includes converting the dependent frame without decompressing any image to an image domain.

9. An apparatus that converts an input sequence of compressed input images into an output sequence of compressed images, the input sequence including at least one group of images (that does not depend upon any other images for reconstruction from a compressed format), the group of images having at least one compressed dependent frame that contains data for reconstructing one image based upon data from a second image in the group of images, said apparatus comprising:
   memory that receives the input sequence; and an editor that receives user commands to edit the input sequence and that, responsive to user commands, alters the temporal order of at least one image from the compressed image sequence (including an image represented by the dependent frame) with respect to another image in the input sequence, the editor including one of firmware, hardware and software that converts the dependent frame to a compressed data format that does not depend upon the second image, without decompressing all images in the group of images to an image domain, alters the temporal order of at least one image in the sequence (including an image represented by the dependent frame), and formats the compressed output image sequence to reflect the altered temporal order.

10. An apparatus according to claim 9, further comprising means for splicing a satellite feed of images with a second image sequence, to produce a third, composite image sequence.

11. An apparatus according to claim 9, further comprising means for cutting a first image sequence and splicing a remaining portion of the first image sequence to a second image sequence within a compressed domain.

12. An apparatus according to claim 9, further comprising means for formatting the compressed output image sequence to represent the input image sequence in reverse-play-order.

13. An apparatus, comprising:

means for receiving a compressed input image sequence;

means for manipulating the compressed input image sequence in a compressed domain, without decompressing any image in the input image sequence to a image domain, including one of means for cutting the compressed input image sequence and splicing remaining images of the compressed image sequence to a second image sequence and means for reversing play-order of images represented by the input image sequence; and means for producing a compressed output image sequence.

14. An apparatus operative to receive compressed image data complying with a Moving Pictures Experts' Group (M.P.E.G.) Standard and including information representing a sequence of independent (I) frames, prediction (P) frames and bidirectional (B) frames, to edit temporal order of images represented by the sequence in response to a set of one or more commands, and to provide an output of image data that is compressed and compliant with a MPEG Standard, said apparatus comprising:

machine readable media; and instructions stored on the machine readable media that instruct a machine to receive data representing I, P and B frames, perform, with respect to a particular frame selected in response to the set of one or more commands, a conversion including one of (a) conversion of a P frame to an I frame by removing dependence of the P frame upon data from any other frame, (b) conversion of a B frame to a B frame having no dependence upon data from future frames, such that the B frame as converted only depends upon one or more prior frames in the sequence of data, and (c) conversion of a B frame to a B frame having no dependence upon data from prior frames, such that the B frame as converted only depends upon one or more future frames in the sequence of data, and alter temporal order of at least one image represented by the sequence (including an image represented by the dependent frame) with respect to another image in response to the commands, and produce therefrom the output of compressed data, wherein the conversion is automatically selected (in response to the set of one or more commands and in response to whether the particular frame is an I, P or B frame) to eliminate a temporal dependency between any frame representing the at least one image which is to be altered in temporal order with respect to another image.

15. An apparatus according to claim 14, wherein the particular frame is part of a group of pictures (GOP) and wherein the instructions instruct a machine to perform the conversion by:

converting the particular frame to an image domain; and re-converting, once a particular image represented by the particular frame has been altered in temporal order with respect to another image, the particular image to one of an I frame and P frame and B frame format;

whereby the sequence of images has been edited to produce a MPEG compliant output without fully decompressing an entire GOP to an image domain.

16. An apparatus according to claim 14, wherein the instructions instruct a machine to perform the conversion in a transform-domain, without decompressing the particular frame to an image domain.

17. An apparatus according to claim 14, wherein the instructions instruct a machine to perform the conversion by directly altering motion vectors and discrete cosine transform coefficients, without performing an inverse discrete cosine transformation.

18. An apparatus according to claim 14, wherein said apparatus further provides capability to play a sequence of images backward and wherein:

the instructions instruct a machine to alter temporal order by reversing temporal dependencies of each of a plurality of frames selected from the group of I, P and B frames.

19. An apparatus according to claim 14, wherein said apparatus further provides capability to splice a first sequence of images with a second sequence of images, and wherein:

the instructions instruct a machine to clip a tail frame of the first sequence by converting the tail frame to eliminate any temporal dependencies upon future frames in the first sequence;

the instructions instruct a machine to clip a head frame of the second sequence by converting the head frame to eliminate any temporal dependencies upon prior frames in the second sequence; and the instruction instruct a machine to splice the first and second sequences together to form a third sequence, in which an image represented by the head frame immediately follows an image represented by the tail frame when the third sequence is decompressed.

20. An apparatus according to claim 19, wherein the instructions further instruct a machine to change bit rates of the head frame.

21. An apparatus according to claim 19, wherein the instructions further instruct a machine to match bit rates of the head frame to the tail frame by further quantizing one of the head frame and the tail frame.

22. An apparatus according to claim 19, wherein the instructions further instruct a machine to match bit rates of the head frame to the tail frame by further converting one of (a) an I frame to a P frame and (b) a P frame to a B frame.

* * * * *